(12) United States Patent
Chiou et al.

(10) Patent No.: US 8,122,180 B2
(45) Date of Patent: Feb. 21, 2012

(54) METHODS AND SYSTEMS FOR RECONFIGURING DATA MEMORY OF EMBEDDED CONTROLLER MANAGED FLASH MEMORY DEVICES

(75) Inventors: Alan M. Chiou, Mountain View, CA (US); Wes Shi-Yen Lee, Fremont, CA (US); Benjamin Telya, Modesto, CA (US); Donald J. Kadish, San Jose, CA (US)

(73) Assignee: SanDisk Technologies Inc., Plano, TX (US)

( * ) Notice: Subject to any disclaimer, the term of this patent is extended or adjusted under 35 U.S.C. 154(b) by 538 days.

(21) Appl. No.: 12/030,740

(22) Filed: Feb. 13, 2008

(65) Prior Publication Data

US 2009/0204744 A1 Aug. 13, 2009

(51) Int. Cl.
*G06F 12/00* (2006.01)
(52) U.S. Cl. ........................................ 711/103; 711/115
(58) Field of Classification Search .................. 711/103, 711/115
See application file for complete search history.

(56) References Cited

U.S. PATENT DOCUMENTS

| | | | | |
|---|---|---|---|---|
| 6,856,943 B2* | 2/2005 | Murphy et al. | ............... | 702/186 |
| 7,225,357 B2 | 5/2007 | Tai et al. | | |
| 7,346,730 B2* | 3/2008 | Takeda | .......................... | 711/102 |
| 7,412,558 B2* | 8/2008 | Oribe et al. | .................... | 711/103 |
| 7,673,080 B1* | 3/2010 | Yu et al. | .......................... | 710/62 |
| 7,676,714 B2 | 3/2010 | Chiou et al. | | |
| 7,685,478 B2 | 3/2010 | Chiou et al. | | |
| 2004/0078169 A1* | 4/2004 | Oba et al. | ...................... | 702/186 |
| 2004/0158669 A1* | 8/2004 | Weng et al. | .................... | 711/103 |
| 2006/0026338 A1* | 2/2006 | Ebara et al. | .................... | 711/103 |
| 2006/0037008 A1 | 2/2006 | Stelzer et al. | | |
| 2006/0041854 A1 | 2/2006 | Schlanger et al. | | |
| 2008/0052507 A1* | 2/2008 | Chow et al. | ........................ | 713/2 |
| 2008/0244140 A1 | 10/2008 | Chiou et al. | | |
| 2008/0244143 A1 | 10/2008 | Chiou et al. | | |

OTHER PUBLICATIONS

"SCSI", Wikipedia, http://en.wikipedia.org/wiki/SCSI (Jan. 7, 2008).
INFO: SCSI Pass Through Functionality and Limitations, Microsoft Coporation (Copyright 2008).
SanDisk ImageMate® 12-in-1 Reader/Writer, SanDisk Corporation (Copyright 2008).
"Secure Digital card", Wikipedia, http://en.wikipedia.org/wiki/Secure_Digital_card (Dec. 19, 2007).

(Continued)

*Primary Examiner* — Hashem Farrokh
(74) *Attorney, Agent, or Firm* — Jenkins, Wilson, Taylor & Hunt, P.A.

(57) ABSTRACT

Methods and systems for reconfiguring data memory of an embedded controller managed flash memory device are disclosed. According to one method, using a controller managed flash memory device reconfiguration module configured to execute on a general purpose computing platform separate from a computing platform in which an embedded controller managed flash memory device is located, reconfiguration data to be written to a data memory of the embedded controller managed flash memory device is received from a user and I/O commands for writing the reconfiguration data to an external device are generated. Flash device commands corresponding to the I/O commands are generated. The reconfiguration data is communicated to the data memory of the embedded controller managed flash memory device by sending the flash device commands and the reconfiguration data over a flash device interface of the embedded controller managed flash memory device.

24 Claims, 5 Drawing Sheets

OTHER PUBLICATIONS

Commonly-assigned, co-pending U.S. Appl. No. 11/693,648 for "Extender Strip and Test Assembly for Testing Memory Card Operation" (Filed Mar. 29, 2007, Unpublished).

Commonly-assigned, co-pending U.S. Appl. No. 11/693,644 for "Method of Testing Memory Card Operation" (Filed Mar. 29, 2007, Unpublished).

SD Specifications, Part 1, Physical Layer, Simplified Specification, Version 2.00, SD Group, Technical Committee (Sep. 25, 2006).

Supplemental Notice of Allowability for U.S. Appl. No. 11/693,648 (Dec. 2, 2009).

Supplemental Notice of Allowability for U.S. Appl. No. 11/693,644 (Dec. 1, 2009).

Notice of Allowance and Fee(s) Due for U.S. Appl. No. 11/693,648 (Oct. 16, 2009).

Notice of Allowance and Fee(s) Due for U.S. Appl. No. 11/693,644 (Oct. 15, 2009).

Response to Office Action for U.S. Appl. No. 11/693,644 (Aug. 3, 2009).

Response to Office Action for U.S. Appl. No. 11/693,648 (Jul. 30, 2009).

Non-Final Official Action for U.S. Appl. No. 11/693,644 (May 29, 2009).

Non-Final Official Action for U.S. Appl. No. 11/693,648 (Apr. 30, 2009).

* cited by examiner iNAND BootLoader Configuration Tool  ☐  ✕

Operation

○ Read specified LBA from device into a file.
○ Write specified file data into specified LBA on the device.
○ Write incremental data pattern to the device.
○ Write random data pattern to the device.
○ Write user desired data pattern. Pattern = [    ]
○ Read LBA sector content. From LBA = [    ]
○ Format the device to the size in Sectors. [    ]
○ Read specified File Content. (Use Browse to select the file.)
⦿ Input BootLoader Files. (Click Execute button to begin.)

[                              ]  [ Browse ]

LBA Range

Starting LBA at: [    ]   Ending LBA at: [    ]

[                                              ]

Device = 246016 sectors
Ver 0.1   Development 9/12/2007

PBR @: 97    DIR @: 160
FAT1 @: 98   FAT2 @: 129

[ Format ]  [ Get CID/CSD ]  [ Re Init ]
[ Execute ] [ Close ]

FIG. 2

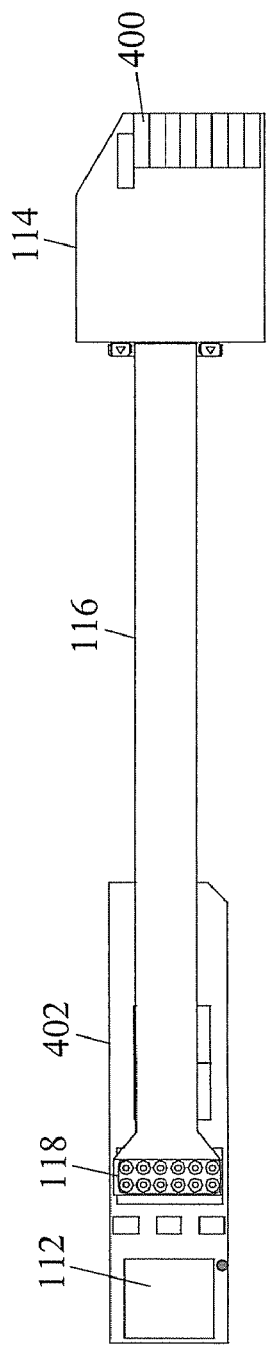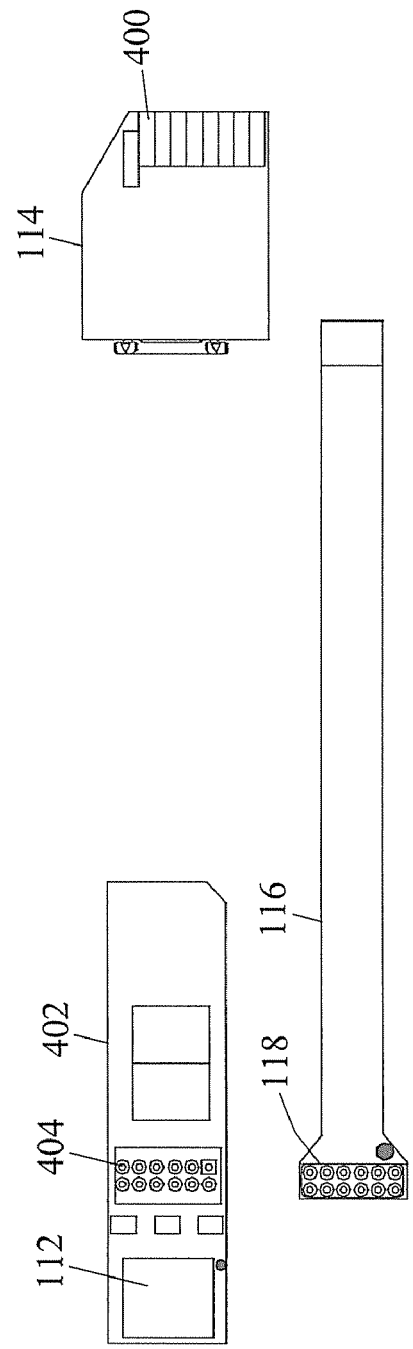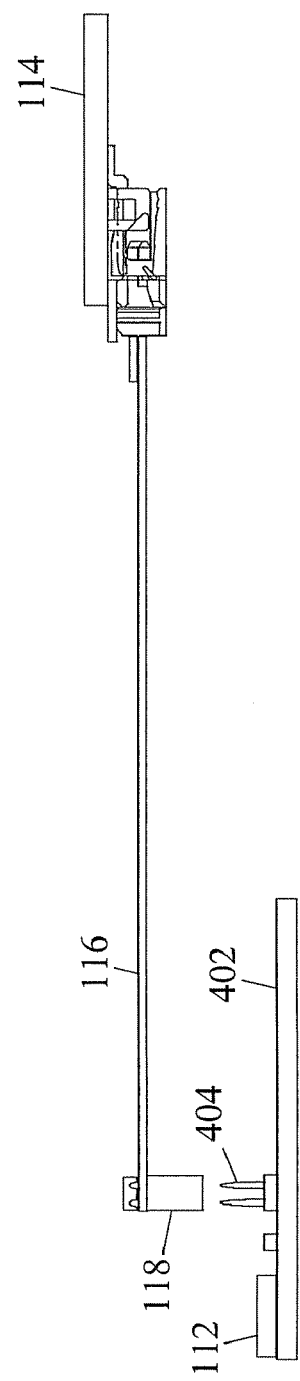

METHODS AND SYSTEMS FOR RECONFIGURING DATA MEMORY OF EMBEDDED CONTROLLER MANAGED FLASH MEMORY DEVICES

TECHNICAL FIELD

The subject matter described herein relates to reconfiguring data memory of embedded devices. More particularly, the subject matter described herein relates to methods and systems for reconfiguring data memory of embedded controller managed flash memory devices.

BACKGROUND

Controller managed flash memory devices, such as Secure Digital (SD), devices and MultiMediaCard (MMC) devices, each include a controller with its associated program memory and data memory. In order to configure the data memory of such a device, it is necessary to issue commands to the controller according to a protocol specified for the type of device. For example, data memories of SD devices can be configured by issuing SD commands to the SD controller and writing data over data signal lines coupled to the controller, and data memories of MMC devices can be configured by issuing MMC commands to the MMC controller and writing data over data signal lines coupled to the controller.

As used herein the term "controller managed flash memory device" refers to a flash memory device with a controller that implements a protocol for allowing read and write access to its associated flash memory. The term "embedded controller managed flash memory device" refers to a controller managed flash memory device that has been soldered or otherwise physically connected to a printed circuit board of another system that will use the flash device during its operation. The term "SD device" refers to a device that meets or substantially meets the requirements set forth for SD devices by the SD Card Association. The term "MMC device" refers to a device that meets or substantially meets the requirements for MMC devices set forth by Siemens AG and SanDisk Corporation.

SD and MMC devices are examples of controller managed flash memory devices because both include controllers that implement protocols for allowing read and write access to an associated flash memory. SD and MMC devices are commonly used as stand-alone removable storage devices for portable storage of digital data. For example, both SD and MMC devices are commonly used as stand-alone removable storage devices for digital cameras.

In addition to stand-alone removable storage applications, SD and MMC devices, as well as other controller managed flash memory devices, may be embedded in computing systems by soldering the devices to printed circuit boards. For example, portable electronics devices, such as digital media players and mobile phones may include embedded controller managed flash memory devices. The use of embedded controller managed flash memory devices in portable electronics devices is advantageous because of the compact design of the flash memory devices. A device that includes an embedded SD or MMC device is often referred to as an embedded system.

Before being used in embedded systems, it may be desirable to configure the data memories of controller managed flash memory devices by writing to the data memories data that is used by the embedded systems during operation. For example, data memories of embedded controller managed flash memory devices may be configured with databases, embedded system information, or any other data that is used by embedded systems during operation.

Initial configuration of data memories of controller managed flash memory devices typically occurs before the devices are embedded in their respective operating environments. For example, chip sockets designed to fit the pin or pad layouts and form factors of controller managed flash memory devices may be used to connect the devices to a special purpose programming platform that issues the configuration commands and writes the configuration data to the flash memories. Because the pins or pads of unembedded controller managed flash memory devices are physically accessible during initial programming, such programming can occur without significant difficulty. However, once controller managed flash memory devices are embedded in the systems in which the flash memory devices are intended to operate, reprogramming or reconfiguring the data memories is difficult due to lack of physical access to the controller managed flash memory device signal pins or pads. Moreover, the unavailability of embedded programming hardware or software capable of implementing the protocols required to reconfigure or reprogram the data memory of an embedded controller managed flash memory device also makes reconfiguration of data memories of embedded controller managed flash memory devices difficult.

Devices for reconfiguring embedded controllers exist. However, such devices rewrite the program memory to reconfigure the controller and do not implement the protocol by which the controller communicates to reprogram the data memory. In addition, such devices may require special purpose programming hardware separate from the programming data generation source and, in some cases, command generation hardware embedded in the same device or system as the controller. Requiring special purpose programming hardware in the device or system where the controller is located increases the cost and complexity of the device or system. In addition, requiring special purpose external programming hardware increases the cost and time required to reprogram embedded controllers.

Devices for programming embedded read only memories (ROMs) also exist. However, such devices do not implement the protocols required to communicate with a controller to reprogram the data memory of a controller managed flash memory device.

Accordingly, in light of these difficulties, there exists a need for methods and systems for reconfiguring data memory of embedded controller managed flash memory devices.

SUMMARY

The subject matter described herein includes methods and systems for reconfiguring a data memory of controller managed flash memory device. According to one method, using a controller managed flash memory device reconfiguration module configured to execute on a general purpose computing platform separate from a computing platform in which an embedded controller managed flash memory device is located, reconfiguration data to be written to a data memory of the embedded controller managed flash memory device is received from a user and I/O commands for writing the reconfiguration data to an external device are generated. Flash device commands corresponding to the I/O commands are generated. The reconfiguration data is communicated to the data memory of the embedded controller managed flash memory device by sending the flash device commands and the reconfiguration data over a flash device interface of the embedded controller managed flash memory device.

According to another aspect of the subject matter described herein, a method for reconfiguring data memory of an embedded controller managed flash memory device is provided. The method includes, using a controller managed flash memory device reconfiguration module, receiving, from a user, reconfiguration data to be written to data memory of an embedded controller managed flash memory device and generating I/O commands for writing the reconfiguration data to an external device. The method further includes, using a controller managed flash memory device reader/writer, receiving the reconfiguration data and the I/O commands from the controller managed flash memory device reconfiguration module and generating flash device commands corresponding to the I/O commands for writing the reconfiguration data to the embedded controller managed flash memory device. The method further includes, using a controller managed flash memory device reader/writer compatible printed circuit board insertable into the controller managed flash memory device reader/writer, receiving the flash device commands and the reconfiguration data from the controller managed flash memory device reader/writer. The method further includes communicating flash device commands and the reconfiguration data from the controller managed flash memory device reader/writer compatible printed circuit board to the embedded controller managed flash memory device.

According to yet another aspect of the subject matter described herein, a method for reconfiguring data memory of an embedded secure digital (SD) device is provided. The method includes, using an SD device reconfiguration module, receiving, from a user, reconfiguration data to be written to data memory of an embedded SD device and generating I/O commands for writing the reconfiguration data to an external device. The method further includes, using an SD device reader/writer, receiving the I/O commands and the reconfiguration data from the SD device reconfiguration module and generating SD commands corresponding to the I/O commands. The method further includes, using an SD device reader/writer compatible printed circuit board insertable in the SD device reader/writer, receiving the SD commands and the reconfiguration data from the SD device reader/writer. The method further includes communicating the SD commands and the reconfiguration data to the embedded SD device.

According to another aspect of the subject matter described herein, a system for reconfiguring data memory of an embedded controller managed flash memory device via a flash device interface of the embedded controller managed flash memory device is provided. The system includes a controller managed flash memory device reconfiguration module configured to execute on a general purpose computing platform separate from a platform in which an embedded controller managed flash memory device is located for receiving, from a user, reconfiguration data to be written to data memory of the embedded controller managed flash memory device and for generating input/output (I/O) commands for writing the reconfiguration data to an external device. The system also includes means for generating flash device commands corresponding to the I/O commands and for communicating the flash device commands and the reconfiguration data from the controller managed flash memory device reconfiguration module to the embedded controller managed flash memory device via a flash device interface of the embedded controller managed flash memory device so that the reconfiguration data is written to the data memory of the embedded controller managed flash memory device.

According to yet another aspect of the subject matter described herein, a system for reconfiguring data memory of an embedded controller managed flash memory device via a flash device interface of the device is provided. The system includes a controller managed flash memory device reconfiguration module for receiving, from a user, reconfiguration data to be written to data memory of an embedded controller managed flash memory device and for generating I/O commands for writing the reconfiguration data to an external device. The system further includes a controller managed flash memory device reader/writer for receiving the reconfiguration data and the I/O commands from the controller managed flash memory device reconfiguration module and for generating flash device commands corresponding to the I/O commands for writing the reconfiguration data to the embedded controller managed flash memory device. The system further includes a controller managed flash memory device reader/writer compatible printed circuit board insertable into the controller managed flash memory device reader/writer for receiving the flash device commands and the reconfiguration data from the controller managed flash memory device reader/writer. The system further includes an interface for communicating flash device commands and the reconfiguration data from the controller managed flash memory device reader/writer compatible printed circuit board to the embedded controller managed flash memory device.

According to yet another aspect of the subject matter described herein, a system for reconfiguring data memory of an embedded secure digital (SD) device is provided. The system includes an SD device reconfiguration module for receiving, from a user, reconfiguration data to be written to data memory of an embedded SD device and for generating I/O commands for writing the reconfiguration data to an external device. The system further includes an SD device reader/writer for receiving the I/O commands and the reconfiguration data from the SD device reconfiguration module and for generating SD commands corresponding to the I/O commands. The system further includes an SD device reader/writer compatible printed circuit board insertable in the SD device reader/writer for receiving the SD commands and the reconfiguration data from the SD device reader/writer. The system further includes a cable for communicating the SD commands and the reconfiguration data from the SD device reader/writer compatible printed circuit board to the embedded SD device.

The subject matter described herein for reconfiguring data memory of an embedded controller managed flash memory device can be implemented using a computer readable medium having stored thereon a computer program. Exemplary computer readable media suitable for use with the subject matter described herein includes chip memory devices, disk memory devices, and application specific integrated circuits. In addition, the term "computer readable medium," as used herein, may refer to a single medium located on a single device or computing platform or multiple media distributed across multiple devices or computing platforms.

BRIEF DESCRIPTION OF THE DRAWINGS

Preferred embodiments of the subject matter described herein will now be explained with reference to the accompanying drawings, of which:

FIG. 2 is a computer screen shot of a graphical user interface (GUI) that may be presented by a controller managed flash memory device reconfiguration module according to an embodiment of the subject matter described herein;

FIG. 4A is a top view illustrating exemplary components of a system for reconfiguring data memory of an embedded controller managed flash memory device according to an embodiment of the subject matter described herein;

FIG. 4B is an exploded top view illustrating exemplary components of a system for reconfiguring data memory of an embedded controller managed flash memory device according to an embodiment of the subject matter described herein;

FIG. 4C is a side view illustrating exemplary components of system for reconfiguring data memory of an embedded controller managed flash memory device according to an embodiment of the subject matter described herein.

DETAILED DESCRIPTION

Figure 1:
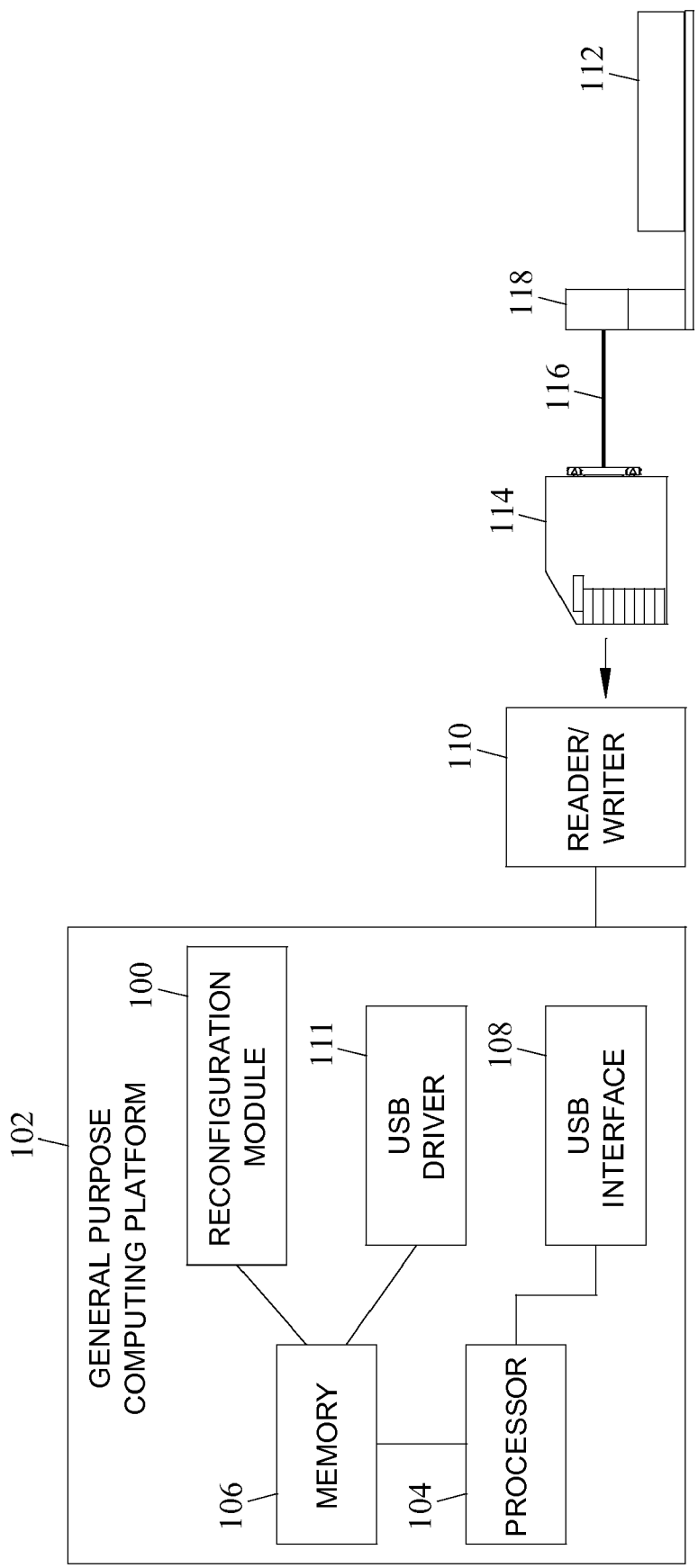
FIG. 1 is a block diagram illustrating an exemplary system for reconfiguring data memory of an embedded controller managed flash memory device according to an embodiment of the subject matter described herein.

The subject matter described herein includes methods and systems for reconfiguring data memory of an embedded controller managed flash memory device. FIG. 1 is a block diagram of an exemplary system for reconfiguring data memory of an embedded controller managed flash memory device according to an embodiment of the subject matter described herein. Referring to FIG. 1, a system for reconfiguring a data memory of an embedded controller managed flash memory device includes a controller managed flash memory device reconfiguration module 100 that executes on a general purpose computing platform 102. General purpose computing platform 102 may be a personal computer or a workstation that includes an operating system and one or more general purpose microprocessors. In the illustrated example, general purpose computing platform 102 includes a processor 104 and memory 106 for storing programs executed by processor 104. Controller managed flash memory device reconfiguration module 100 is an example of a program that may be stored in memory 106 and executed by processor 104. In one implementation, module 100 may receive, from a user, reconfiguration data to be written to a data memory of an embedded controller managed flash memory device and generate I/O commands for writing the reconfiguration data to an external device.

FIG. 2 is a computer screen shot illustrating an exemplary graphical user interface that may be presented by module 100 to receive reconfiguration data from the user. Referring to FIG. 2, the graphical user interface depicted allows a user to define the source and type of reconfiguration data to be written to the logical block address (LBA) of the embedded controller managed flash memory device. In the illustrated example, options presented to the user include:
  read specified LBA from device into a file;
  write specified file data into specified LBA on the device;
  write incremental data pattern to the device;
  write random data to the device;
  write user desired data pattern, where the user can specify the pattern;
  read LBA sector content from a specified LBA address;
  format the device to the size in sectors;
  read specified file content; and
  input boot loader files.

The GUI presented in FIG. 2 also allows the user to define a logical block address range in the data memory space of the embedded controller managed flash memory device where data will be written or read. In addition to allowing the user to read data from or write data to the embedded controller managed flash memory device, the GUI presented in FIG. 2 also allows the user to read the card identification (CID) and card specific data (CSD) registers of the embedded controller managed flash memory device. Once the user specifies the source and/or type of data to be written to or read from the embedded controller managed flash memory device and the logical block address range, the user clicks the execute button to start the desired operation.

If the user issues a write operation, controller managed flash memory device reconfiguration module 100 may generate I/O commands for writing the reconfiguration data to an external device. In the example illustrated in FIG. 1, general purpose computing platform 102 includes a USB interface 108 for communicating with an external reader/writer 110 and a USB driver 111 for controlling USB interface 108. In a Windows® operating environment, controller managed flash memory device reconfiguration module 100 may use small system computer interface (SCSI) pass through commands to trigger reader/writer 110 to generate corresponding flash device commands for writing data to the embedded controller managed flash memory device. The following is an example of a an SCSI pass through command that may be used to trigger reader/writer 110 to generate a flash device command for writing reconfiguration data to an embedded controller managed flash memory device according to an embodiment of the subject matter described herein:

```
if(ret = DeviceIoControl(fileHandle,
    IOCTL_SCSI_PASS_THROUGH,
        psptwb,
        length,
        psptwb,
        length,
        &returned,
        FALSE) )
    {
    status = TRUE;
    if(psptwb->ScsiStatus)
        status = FALSE;
    else
    if((psptwb->DataIn == SCSI_IOCTL_DATA_IN) && (psptwb->DataTransferLength != 0))
memcpy(BufPointer, ((PCHAR) psptwb) + psptwb->DataBufferOffset,
    psptwb->DataTransferLength);
```

In the code example above, the function DeviceIoControl( ) is an example of an SCSI pass through command. The first parameter of the command is a file handle of a file containing data to be written to the data memory of an embedded controller managed flash memory device. The second parameter of the command is a control code for the USB write command, which triggers a USB-connected flash device reader/writer 110 to issue a corresponding flash device write command. The remaining parameters in the command include the sizes and locations of the buffers for input or output parameters, a pointer to an address location for storing the return value of the command, and a Boolean variable used in subsequent program logic. If the DeviceIoControl( ) command is successful, the memcpy( ) command copies the reconfiguration data over the USB interface to an attached USB device, such as reader/writer 110.

In one implementation of the subject matter described herein, reader/writer 110 may be a USB device that receives I/O commands generated by module 100 and generates corresponding SD commands for writing reconfiguration data to the data memory of an embedded SD device. An example of a reader/writer suitable for use with embodiments of the subject matter described herein that write to embedded SD or MMC cards is the ImageMate® 12-in-1 reader/writer available from SanDisk Corporation. The ImageMate® 12-in-1 reader/writer is capable of reading data from and writing data to the following types of cards:

1. CompactFlash®
2. CompactFlash®II
3. SD™
4. SDHC™
5. miniSD™
6. miniSDHC™
7. MultiMediaCard™
8. MMCplus™
9. MMCmobile™
10. RS-MMC™
11. RS-MMC
12. DualVoltage™ MMC, SD, and other controller managed flash cards
13 MemoryStick™
14. Memory Stick Duo™
15. Memory Stick PRO™
16. Memory Stick PRO Duo™

Thus, the term "controller managed flash memory device," as used herein is intended to include any of the above-listed device types, and the subject matter described herein may be used to reconfigure data memories of any of the above listed device types once the devices are embedded. Because a standard commercially available reader/writer can be used to generate the flash device commands for writing to the data memories of these devices, the need for special purpose flash device reconfiguration hardware is reduced.

As stated above, in one embodiment, reader/writer 110 may receive I/O commands from the general purpose computing platform and issue corresponding SD commands according to the SD protocol. The SD protocol is specified in SD Specification Part 1 Physical Layer Simplified Specification, version 2.00, Sep. 25, 2006, the disclosure of which is incorporated herein by reference in its entirety. According to the SD protocol, commands are sent over an SD command signal line and data is sent over one or more SD data signal lines. In order to write data, an SD write command is sent over the command signal line followed by data written over one or more data signal lines. In FIG. 1, reader/writer 110 may be configured to receive USB commands from general purpose computing platform 102 and generate corresponding SD commands for performing the desired read or write operation. The SD commands may be communicated to embedded controller managed flash memory device 112 via an SD compatible printed circuit board 114, a cable 116, a header 118, and SD signal pins (not shown in FIG. 1). In one embodiment, cable 116 comprises a flexible film that, in conjunction with header 118, extends SD signal pins coupled to corresponding SD signal pins or pads of embedded controller managed flash memory device 112 to SD compatible printed circuit board 114. An exemplary flexible film cable suitable for use with embodiments of the subject matter described herein is described in U.S. patent application Ser. No. 11/693,648, filed Mar. 29, 2007, the disclosure of which is incorporated herein by reference in its entirety. Conceptually, cable 116 and header 118 can be thought of as an interface for communicating the flash device commands and the reconfiguration data from printed circuit board 114 to embedded controller managed flash memory device 112. Cable 116 and header 118 extend the SD interface of embedded device 112 to a location where the SD interface can be accessed by an external device. Printed circuit board 114 makes the extended SD interface compatible with reader/writer 110 so that SD commands and reconfiguration data can be written to device 112 via cable 116 and header 118.

Figure 3:
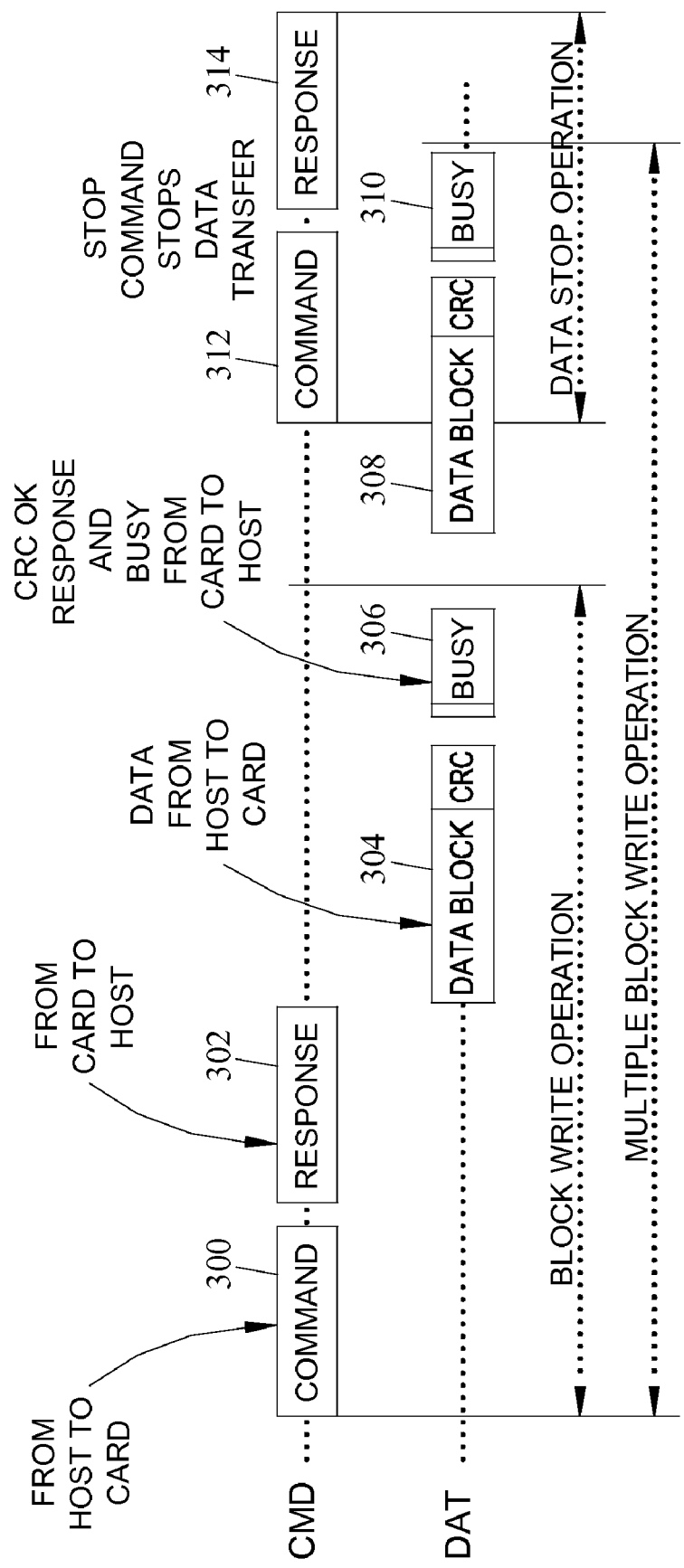
FIG. 3 is a signal diagram illustrating exemplary flash device commands for writing data to the data memory of an embedded controller managed flash memory device according to an embodiment of the subject matter described herein.

FIG. 3 is signal diagram illustrating an exemplary protocol that may be implemented between reader/writer 110 and embedded controller managed flash memory device 112 for writing data to device 112. For example, FIG. 3 illustrates flash device commands that reader/writer 110 may generate in response to an I/O write command generated by module 100. Referring to FIG. 3, CMD indicates an SD command line and DAT indicates an SD data line. Reader/writer 110 may begin by issuing a write command 300 on the command line. Device 112 may respond with a response 302 indicating that device 112 is ready to receive data. In response to receiving response 302, reader/writer 110 may write a data block 304 on the data line. Embedded device 112 responds with a busy indication 306 on the data line indicating that it is busy receiving the data. Reader/writer 110 can issue another data block 308 on the data line, which is followed by a busy indication 310 from device 112. Reader/writer 110 can issue a data stop command 312 that indicates that no additional data blocks will be transferred. Data stop command 312 is followed by a response 314 from device 112 acknowledging the data stop command.

As indicated above, the subject matter described herein is not limited to writing reconfiguration data to the data memory of an embedded SD device. The subject matter described herein can be used to write reconfiguration data to the data memory of any embedded controller managed flash memory device by implementing the appropriate protocol for writing data to such a device. For example, the subject matter described herein may be used to write reconfiguration date to data memory of an embedded MMC device by generating MMC commands that correspond to the SD commands illustrated in FIG. 3 and extending the MMC interface of the embedded MMC device to a location where the signal pins or pads of the embedded MMC device can be accessed by an MMC compatible reader/writer.

FIGS. 4A-4C illustrate exemplary hardware for communicating the commands and reconfiguration data to embedded device 112. More particularly, FIG. 4A is a top view of reader/writer compatible printed circuit board 114, cable 116, embedded device 112, and header 118. In the illustrated example, reader/writer compatible printed circuit board 114 contains SD pads 400 and an SD form factor for receiving SD commands and reconfiguration data from reader/writer 110. Pads 400 may connect to corresponding signal lines in cable 116. Header 118 may be a female connector for mating with corresponding pins on circuit board 402 on which embedded device 112 is soldered.

FIG. 4B is an exploded top view of circuit board 402, cable 116, and controller managed flash memory device reader/writer compatible print circuit board 114. In FIG. 4B, it can be seen that circuit board 402 includes pins 404 for connecting with header 118. Pins 404 may be routed to corresponding SD signal pins or pads of SD device 112. The particular routing to the SD signal pins or pads depends on the topology of circuit board 402 and is not essential to explaining the subject matter described herein. Such routing can be achieved using conductive traces that connect each embedded SD device pin or pad to each corresponding pin 404.

FIG. 4C is a side view of cable 116, circuit board 402, and controller managed flash memory device reader/writer compatible printed circuit board 114. It can be seen in FIG. 4C that header 118 fits over pins 404 to communicate SD commands and reconfiguration data to embedded device 112.

The subject matter described herein is not limited to the hardware illustrated in FIGS. 4A-4C for communicating flash device commands and reconfiguration data to embedded device 112. Any suitable interface that extends or couples flash device signal pins to a device capable of issuing flash device commands and communicating reconfiguration data to the embedded device may be used without departing from the scope of the subject matter described herein.

Figure 5:
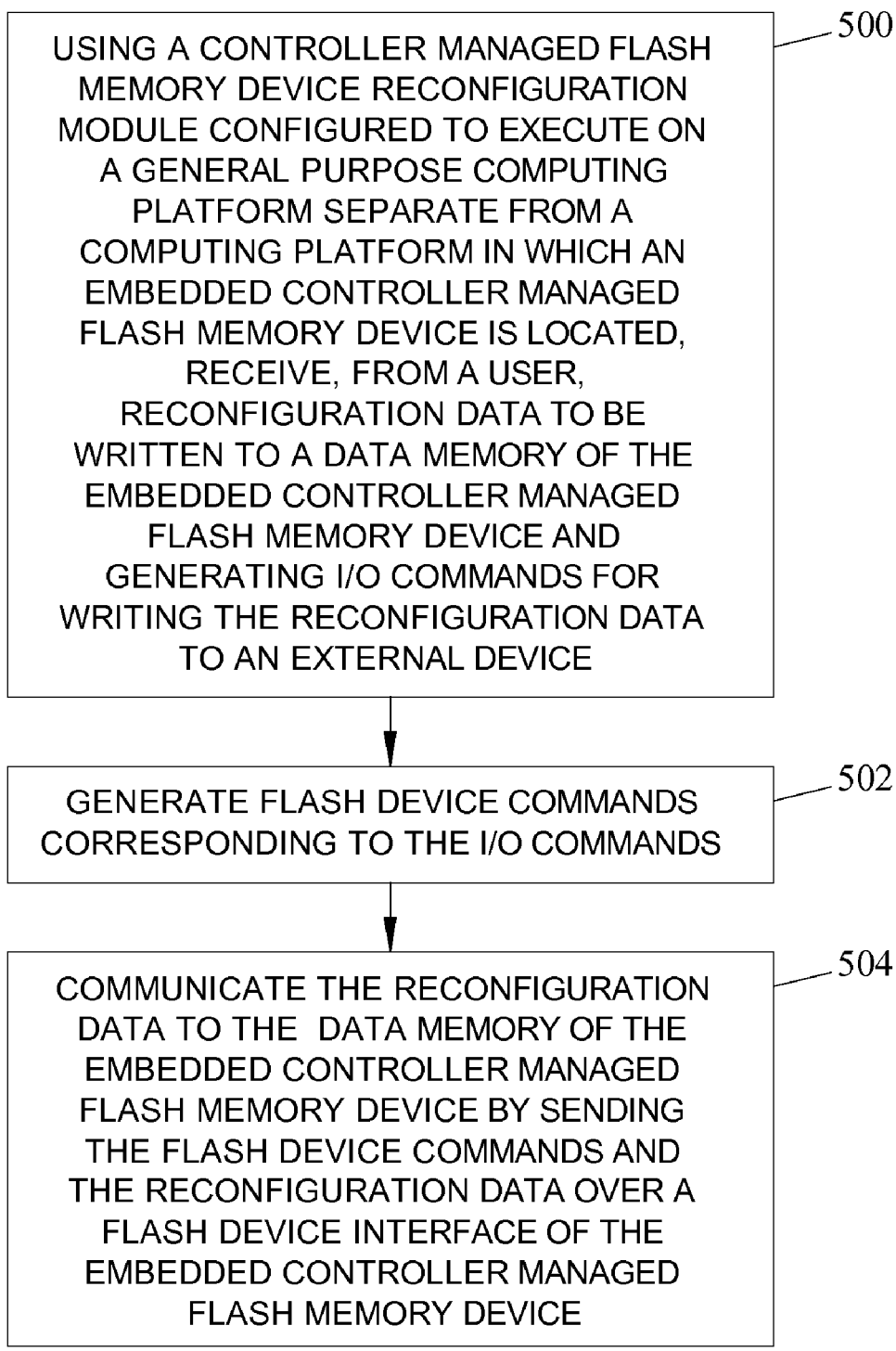
FIG. 5 is a flow chart illustrating an exemplary process for reconfiguring data memory of an embedded controller managed flash memory device according to an embodiment of the subject matter described herein.

FIG. 5 is a flow diagram illustrating an exemplary process for reconfiguring a data memory of an embedded controller managed flash memory device according to an embodiment of the subject matter described herein. Referring to FIG. 5, in block 500, a controller managed flash memory device reconfiguration module configured to execute on a general purpose computing platform separate from a computing platform in which an embedded controller managed flash memory is located is used to receive, from a user, reconfiguration data to be written to a data memory of an embedded controller managed flash memory device. For example, referring to FIG. 1, controller managed flash memory device reconfiguration module 100 may receive reconfiguration data from a user. Module 100 is separate from the computing platform in which embedded controller managed flash memory device 112 is located. In addition, it should be noted that in the example illustrated in FIG. 1, module 100 is located on the same computing platform where the reconfiguration data is generated. Also in block 500, module 100 generates I/O commands for writing reconfiguration data to an external device. Referring again to FIG. 1, module 100 generates I/O commands, such as the SCSI pass through commands described above, for writing data to printed circuit board 114 via reader/writer 110. Because the I/O commands can be generated from a general purpose computing platform 102 using software that executes on that platform, embedded flash device command generation hardware to communicate with the controller of the embedded device is not required.

In block 502, flash device commands corresponding to the I/O commands are generated. For example, reader/writer 110 may generate one or more flash device write commands in response to execution of the DeviceIoControl( ) command described above. In block 504, the reconfiguration data is communicated to the data memory of the embedded controller managed flash memory device by sending the flash device commands and the reconfiguration data over a flash device interface of the embedded controller managed flash memory device. As described above, when reconfiguring data memory of an embedded SD device, the SD commands are carried over the command line of the SD interface. The data commands are carried over one or more data signal lines of the SD device interface. The receipt of a write command over the write line triggers the controller of device 112 to write data received over the data line to the data memory of device 112. The terms "flash device interface" or "SD device interface," as used herein, refer to the interface over which commands and data are communicated to the controller of the embedded controller managed flash memory device.

Thus, by using software executing on a general purpose computing platform, a standard flash device reader/writer, and an interface for connecting the reader/writer to the embedded controller managed flash memory device, the subject matter described herein allows reconfiguration of data memory of an embedded controller managed flash memory device without special purpose embedded programming hardware or special purpose external programming hardware. Because an embedded device can be reconfigured without removing the device from the system in which it is embedded, the speed and efficiency for testing and reconfiguring data memories of embedded devices is increased. In addition, because module 100 and reader/writer 110 implement protocols for communicating the reconfiguration data to embedded controller managed flash memory device 112, reconfiguration of the data memory of an embedded flash device managed by a controller can be achieved.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A system for writing reconfiguration data to data memory of an embedded controller managed flash memory device via a flash device interface of the embedded controller managed flash memory device, the system comprising:

a controller managed flash memory device reconfiguration module configured to execute on a general purpose computing platform separate from a platform in which a controller managed flash memory device is embedded for receiving, from a user, reconfiguration data to be written to data memory of the controller managed flash memory device and for generating input/output (I/O) commands for writing the reconfiguration data to an external device, wherein the controller managed flash memory device is soldered to a printed circuit board of the platform in which the controller managed flash memory device is embedded; and means for generating flash device commands corresponding to the I/O commands and for communicating the flash device commands and the reconfiguration data from the controller managed flash memory device reconfiguration module to the controller managed flash memory device via a flash device interface of the controller managed flash memory device so that the reconfiguration data is written to the data memory of the controller managed flash memory device, wherein the means for generating and communicating includes a controller managed flash memory device reader/writer compatible printed circuit board separate from the printed circuit board of the platform in which the controller managed flash memory device is embedded and separate from a controller managed flash memory device reader/writer for communicating commands and the reconfiguration data from the memory card reader/writer to the controller managed flash memory device, wherein the controller managed flash memory device reader/writer compatible printed circuit board includes a secure digital (SD) card or multimedia card (MMC) form factor for receiving SD or MMC commands and reconfiguration data from an SD-compatible or MMC-compatible reader/writer.

2. The system of claim 1 wherein the controller managed flash memory device reconfiguration module presents a graphical user interface to the user or allowing the user to select a type of reconfiguration data to be written to the data memory of the controller managed flash memory device.

3. The system of claim 1 wherein the controller managed flash memory device reader/writer is configured for receiving the I/O commands and the reconfiguration data from the general purpose computing platform and for generating the flash device commands.

4. The system of claim 3 wherein the controller managed flash memory device reader/writer compatible printed circuit board is insertable in the controller managed flash memory device reader/writer for receiving the flash device commands and the reconfiguration data to be written to the data memory of the controller managed flash memory device.

5. The system of claim 3 wherein the controller managed flash memory device reader/writer includes a universal serial bus (USB) interface for receiving small system computer interface (SCSI) pass through commands from the general purpose computing platform.

6. The system of claim 5 wherein the I/O commands comprise SCSI pass through commands wherein the reader/writer is configured to generate the flash device commands based on the SCSI pass through commands and, wherein the controller managed flash memory device reader/writer is configured to communicate the flash device commands and the reconfiguration data to the controller managed flash memory device reader/writer compatible printed circuit board.

7. The system of claim 4 wherein the means for generating and communicating includes a cable for connecting the controller managed flash memory device reader/writer compatible printed circuit board to the controller managed flash memory device.

8. The system of claim 7 wherein the means for generating and communicating includes a header coupled to the cable for connecting the cable to corresponding flash device signal pins coupled to the flash device interface of the controller managed flash memory device.

9. The system of claim 1 wherein the controller managed flash memory device comprises a secure digital (SD) device, wherein the flash device commands comprise SD commands and wherein the means for generating and communicating is adapted to communicate the SD commands to the controller and the reconfiguration data to the data memory of the SD device via an SD interface of the SD device.

10. The system of claim 1 wherein the controller managed flash memory device comprises a multimedia card (MMC) device, wherein the flash device commands comprise MMC commands and wherein the means for communicating is adapted to communicate the to the controller and the reconfiguration data to the data memory of the MMC device via an MMC interface of the MMC device.

11. A system for writing reconfiguration data to data memory of an embedded controller managed flash memory device, the system comprising:
a controller managed flash memory device reconfiguration module for receiving, from a user, reconfiguration data to be written to data memory of a controller managed flash memory device and for generating I/O commands for writing the reconfiguration data to an external device, wherein the controller managed flash memory device is soldered to a printed circuit board of a computing platform in which the controller managed flash memory device is embedded;
a controller managed flash memory device reader/writer for receiving the reconfiguration data and the I/O commands from the controller managed flash memory device reconfiguration module and for generating flash device commands corresponding to the I/O commands for writing the reconfiguration data to the controller managed flash memory device;
a controller managed flash memory device reader/writer compatible printed circuit board separate from the printed circuit board of the computing platform in which the controller managed flash memory device is embedded, separate from the controller managed flash memory device reader/writer, and insertable into the controller managed flash memory device reader/writer for receiving the flash device commands and the reconfiguration data from the controller managed flash memory device reader/writer, wherein the controller managed flash memory device reader/writer compatible printed circuit board includes a secure digital (SD) card or multimedia card (MMC) form factor for receiving SD or MMC commands and reconfiguration data from an SD-compatible or MMC-compatible reader/writer; and
an interface for communicating flash device commands and the reconfiguration data from the controller managed flash memory device reader/writer compatible printed circuit board to the controller managed flash memory device.

12. A system for writing reconfiguration data to data memory of an embedded secure digital (SD) device, the system comprising:
an SD device reconfiguration module for receiving, from a user, reconfiguration data to be written to data memory of an SD device and for generating I/O commands for writing the reconfiguration data to an external device, wherein the SD memory device is soldered to a printed circuit board of a computing platform in which the SD memory device is embedded;
an SD device reader/writer for receiving the I/O commands and the reconfiguration data from the SD device reconfiguration module and for generating SD commands corresponding to the I/O commands;
an SD device reader/writer compatible printed circuit board separate from the printed circuit board of the computing platform in which the SD memory device is embedded, separate from the SD device reader/writer, and insertable in the SD device reader/writer for receiving the SD commands and the reconfiguration data from the SD device reader/writer, wherein the SD device reader/writer compatible printed circuit board has an SD form factor for interfacing with the SD device reader/writer and receiving the SD commands and reconfiguration data; and
a cable for communicating the SD commands and the reconfiguration data from the SD device reader/writer compatible printed circuit board to the embedded SD device.

13. A method for writing reconfiguration data to data memory of an embedded controller managed flash memory device via a flash device interface of the embedded controller managed flash memory device, the method comprising:
using a controller managed flash memory device reconfiguration module configured to execute on a general purpose computing platform separate from a computing platform in which a controller managed flash memory device is embedded, wherein, the controller managed flash memory device is soldered to a printed circuit board of a computing platform in which the controller managed flash memory device is embedded:
receiving, from a user, reconfiguration data to be written to a data memory of the controller managed flash memory device, and
generating I/O commands for writing the reconfiguration data to an external device;
generating flash device commands corresponding to the I/O commands; and
communicating the reconfiguration data to the data memory of the controller managed flash memory device by sending the flash device commands and the reconfiguration data over a flash device interface of the controller managed flash memory device, wherein communicating the reconfiguration data includes sending the reconfiguration data from the general purpose computing platform to a controller managed flash memory device reader/writer, from the reader/writer to a controller managed flash memory device reader/writer compatible printed circuit board separate from the printed circuit board to which the controller-managed flash memory device is soldered and separate from the reader/writer, and from the reader/writer to the controller managed flash memory device, wherein the controller managed flash memory device reader/writer compatible printed circuit board includes a secure digital (SD) card or multimedia card (MMC) form factor for receiving SD or MMC commands and reconfiguration data from an SD-compatible or MMC-compatible reader/writer.

14. The method of claim 13 comprising, presenting, using the controller managed flash memory device reconfiguration module, a graphical user interface for allowing the user to select different types of reconfiguration data to be written to the controller managed flash memory device.

15. The method of claim 13 wherein communicating the reconfiguration data to the data memory of controller managed flash memory device includes communicating the I/O commands and the reconfiguration data from the general purpose computing platform to the controller managed flash memory device reader/writer, generating flash device commands corresponding to the I/O commands at the flash device reader/writer and communicating the flash device commands and the reconfiguration data from the controller managed flash memory device reader/writer to the flash device interface of the controller managed flash memory device.

16. The method of claim 15 wherein communicating the flash device commands and the reconfiguration data from the controller managed flash memory device reader/writer to the flash device interface of the controller managed flash memory device includes communicating the flash device commands and the reconfiguration data to the controller managed flash memory device reader/writer compatible printed circuit board and communicating the flash device commands and the reconfiguration data from the controller managed flash memory device reader/writer compatible printed circuit board to the flash device interface of the controller managed flash memory device.

17. The method of claim 15 wherein communicating the I/O commands and the reconfiguration data from the general purpose computing platform to the controller managed flash memory device reader/writer includes communicating the I/O commands and the reconfiguration data from the general purpose computing platform via a universal serial bus (USB) interface to the controller managed flash memory device reader/writer.

18. The method of claim 17 wherein communicating the I/O commands and the reconfiguration data via the USB interface includes generating small system computer interface (SCSI) pass through commands for writing the reconfiguration data over the USB interface and wherein communicating the flash device commands and the reconfiguration data to the flash device interface of the controller managed flash memory device includes, at the controller managed flash device reader/writer, communicating the flash device commands and the reconfiguration data to the controller managed flash memory device reader/writer compatible printed circuit board, which is insertable in the controller managed flash device reader/writer and from the controller managed flash memory device reader/writer compatible printed circuit board to the controller managed flash memory device.

19. The method of claim 16 wherein communicating the flash device commands and the reconfiguration data from the controller managed flash memory device reader/writer compatible printed circuit board to the flash device interface of the controller managed flash memory device includes communicating the flash device commands and the reconfiguration data from the controller managed flash memory device reader/writer compatible printed circuit board via a cable to the flash device interface of the controller managed flash memory device.

20. The method of claim 19 wherein communicating the flash device commands and the reconfiguration data via a cable to the controller managed flash memory device includes communicating the flash device commands and the reconfiguration data to the flash device interface of the controller managed flash memory device via a header coupled to the cable and to flash device signal pins coupled to the flash device interface of the controller managed flash memory device.

21. The method of claim 13 wherein the controller managed flash memory device comprises a secure digital (SD) device and wherein sending the flash device commands and the reconfiguration data over a flash device interface of the controller managed flash memory device includes communicating the flash device commands and the reconfiguration data to the SD device via an SD interface of the SD device.

22. The method of claim 13 wherein the controller managed flash memory device comprises a multimedia card (MMC) device and wherein sending the flash device commands and the reconfiguration data over a flash device interface of the controller managed flash memory device includes communicating the flash device commands and the reconfiguration data to the MMC device via an MMC interface of the MMC device.

23. A method for writing reconfiguration data to data memory of an embedded controller managed flash memory device, the method comprising:
  using a controller managed flash memory device reconfiguration module, receiving, from a user, reconfiguration data to be written to data memory of a controller managed flash memory device and generating I/O commands for writing the reconfiguration data to an external device, wherein the controller managed flash memory device is soldered to a printed circuit board of a computing platform in which the controller managed flash memory device is embedded;
  using a controller managed flash memory device reader/writer, receiving the reconfiguration data and the I/O commands from the controller managed flash memory device reconfiguration module and generating flash device commands corresponding to the I/O commands for writing the reconfiguration data to the controller managed flash memory device;
  using a controller managed flash memory device reader/writer compatible printed circuit board that is separate from the printed circuit board of the computing platform in which the controller managed flash memory device is embedded, separate from the controller managed flash memory device reader/writer, and insertable into the controller managed flash memory device reader/writer, receiving the flash device commands and the reconfiguration data from the controller managed flash memory device reader/writer, wherein the controller managed flash memory device reader/writer compatible printed circuit board includes a secure digital (SD) card or multimedia card (MMC) form factor for receiving SD or MMC commands and reconfiguration data from an SD-compatible or MMC-compatible reader/writer; and
  communicating flash device commands and the reconfiguration data from the controller managed flash memory device reader/writer compatible printed circuit board to the controller managed flash memory device.

24. A method for writing reconfiguration data to data memory of an embedded secure digital (SD) device, the method comprising:

using an SD device reconfiguration module, receiving, from a user, reconfiguration data to be written to data memory of an embedded SD device and generating I/O commands for writing the reconfiguration data to an external device, wherein the SD device is soldered to a printed circuit board of a computing platform in which the SD device is embedded;

using an SD device reader/writer, receiving the I/O commands and the reconfiguration data from the SD device reconfiguration module and generating SD commands corresponding to the I/O commands;

using an SD device reader/writer compatible printed circuit board that is separate from the printed circuit board of the computing platform in which the SD is embedded, separate from the SD device reader/writer, and insertable in the SD device reader/writer, receiving the SD commands and the reconfiguration data from the SD device reader/writer, wherein the SD device reader/writer compatible printed circuit board has an SD card form factor for receiving the SD commands and the reconfiguration data from the SD device reader/writer; and communicating the SD commands and the reconfiguration data from the SD device reader/writer compatible printed circuit board to the SD device.

* * * * *